US011620654B2

(12) United States Patent
Liscia et al.

(10) Patent No.: US 11,620,654 B2
(45) Date of Patent: Apr. 4, 2023

(54) METHODS AND APPARATUS FOR CONDUCTING SECURE MAGNETIC STRIPE CARD TRANSACTIONS WITH A PROXIMITY PAYMENT DEVICE

(71) Applicant: MasterCard International Incorporated, Purchase, NY (US)

(72) Inventors: Maurice David Liscia, Long Island City, NY (US); Axel Cateland, Scarsdale, NY (US); Ngassam Ngnoumen, Westport, CT (US); David Anthony Roberts, Appleton (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1488 days.

(21) Appl. No.: 14/959,646

(22) Filed: Dec. 4, 2015

(65) Prior Publication Data
US 2016/0162883 A1 Jun. 9, 2016

Related U.S. Application Data

(60) Provisional application No. 62/087,441, filed on Dec. 4, 2014.

(51) Int. Cl.
G06Q 20/40 (2012.01)
G06K 19/06 (2006.01)
(Continued)

(52) U.S. Cl.
CPC ......... *G06Q 20/4018* (2013.01); *G06K 7/084* (2013.01); *G06K 19/06206* (2013.01);
(Continued)

(58) Field of Classification Search
CPC .................................................. G06Q 20/4018
See application file for complete search history.

(56) References Cited

U.S. PATENT DOCUMENTS 8,690,059 B1 4/2014 Wallner
8,814,046 B1 8/2014 Wallner
(Continued)

FOREIGN PATENT DOCUMENTS

WO 2006/107777 A2 10/2006
WO 2013/155627 A1 10/2013
WO 2013155627 A1 10/2013

OTHER PUBLICATIONS

"PCT Search Report and Written Opinion", dated Feb. 4, 2016, for International Application No. PCT/US2015/063735, 10pgs.
(Continued)

*Primary Examiner* — John W Hayes
*Assistant Examiner* — Zehra Raza
(74) *Attorney, Agent, or Firm* — Buckley, Maschoff & Talwalkar LLC

(57) ABSTRACT

Methods and apparatus for enabling a proximity payment device to generate dynamic data for securely conducting a transaction by emulating a magnetic stripe payment card. In an embodiment, a mobile device processor transmits information to a digital enablement service computer to activate a simulated magnetic stripe payment wallet application stored in the mobile device. The mobile device then receives one or more cryptographic keys, generates an unpredictable number (UN), generates dynamic CVC3 data based on the UN, and then assembles emulated magnetic stripe data. During initiation of a purchase transaction, the mobile device processor transmits the emulated magnetic stripe data to a communications interface associated with a merchant device.

11 Claims, 5 Drawing Sheets

(51) Int. Cl.
  *G06K 7/08* (2006.01)
  *G06Q 20/34* (2012.01)
  *G06Q 20/36* (2012.01)
  *G06Q 20/32* (2012.01)
  *G06Q 20/20* (2012.01)
  *G06Q 20/38* (2012.01)

(52) U.S. Cl.
  CPC ....... *G06Q 20/204* (2013.01); *G06Q 20/3227* (2013.01); *G06Q 20/3278* (2013.01); *G06Q 20/347* (2013.01); *G06Q 20/353* (2013.01); *G06Q 20/363* (2013.01); *G06Q 20/38215* (2013.01); *G06Q 2220/00* (2013.01)

(56) References Cited

U.S. PATENT DOCUMENTS

| | | | |
|---|---|---|---|
| 9,390,414 B2* | 7/2016 | Wall | G06Q 20/3278 |
| 9,881,297 B2* | 1/2018 | Kranzley | G06Q 20/20 |
| 2007/0278291 A1 | 12/2007 | Rans et al. | |
| 2012/0173432 A1 | 7/2012 | Yeager | |
| 2012/0280035 A1* | 11/2012 | Liu | G06Q 20/02 |
| | | | 235/380 |
| 2012/0290449 A1 | 11/2012 | Mullen et al. | |
| 2013/0254117 A1* | 9/2013 | Von Mueller | G06Q 20/3829 |
| | | | 705/71 |
| 2013/0262317 A1 | 10/2013 | Collinge et al. | |
| 2014/0052630 A1 | 2/2014 | Bona et al. | |
| 2015/0371234 A1* | 12/2015 | Huang | G06Q 20/36 |
| | | | 705/44 |
| 2016/0125417 A1 | 5/2016 | Huang et al. | |
| 2016/0180120 A1 | 6/2016 | Wallner | |
| 2016/0371514 A1 | 12/2016 | Wallner | |

OTHER PUBLICATIONS

"Taiwanese Office Action", dated Nov. 20, 2018, for Taiwan Application No. 104140812, 5 pp.

"Translation of Taiwanese Office Action" for Taiwan Application No. 104140812, dated Jan. 9, 2019, 6 pp.

PCT Notification Concerning Transmittal of International Preliminary Report on Patentability (Chapter 1 of the Patent Cooperation Treaty), PCT Rule 44bis.1(c)), dated Jun. 15, 2017 (dated Jun. 15, 2017), for International Application No. PCT/US2015/063735, 9pgs.

"IOS Intellectual Property Office of Singapore Written Opinion", dated Jan. 16, 2018, for SG Application No. 11201794541T, 5 pp.

"Communication: Extended European Search Report", dated Jun. 15, 2018 (dated Jun. 15, 2018), European Patent Office, for European Application No. 15865573.8-1217 /3227845 PCT/US2015063735, 8pgs.

"Examination Report No. 1 for standard patent application", IP Australia, dated Dec. 19, 2017, for AU Application No. 2015358442, 3 pp.

"Intellectual Property Office of Singapore", Written Opinion, dated Jul. 25, 2018, for Singapore Application No. 11201704541T, 5 pp.

"First Examination Report", dated Jun. 29, 2020, for Indian Application No. 201717020796, 8 pp.

"European Examination Report", dated Mar. 19, 2020, for European Application No. 15865573.8, 8 pp.

"2nd Substantive Examination with English translation", dated Apr. 18, 2022, for Mexican Application No. 2017/007192, 14 pp.

"1st Substantive Examination with English translation", dated Sep. 22, 2021, for Mexican Application No. 2017/007192, 7 pp.

* cited by examiner

METHODS AND APPARATUS FOR CONDUCTING SECURE MAGNETIC STRIPE CARD TRANSACTIONS WITH A PROXIMITY PAYMENT DEVICE

FIELD OF THE INVENTION

The present disclosure generally relates to methods and apparatus that enable a proximity payment device to generate dynamic data for securely conducting a transaction by emulating a magnetic stripe payment card. In some embodiments, a proximity payment device is configured for generating dynamic data in a one-way communication, and then using Track 1 and Track 2 data to conduct a secure transaction in a manner that emulates or mimics payment by a magnetic stripe payment card.

BACKGROUND

Payment cards such as credit or debit cards are ubiquitous, and for decades such cards have included a magnetic stripe. The consumer's account number is recorded on the magnetic stripe by an issuer financial institution by modifying the magnetism of very small iron-based magnetic particles on a band of magnetic material on the card. Such a magnetic stripe is read by swiping it past a magnetic reading head of a card reader. For example, to consummate a purchase transaction with a payment card having a magnetic stripe, the card is swiped through a magnetic stripe reader that is associated with a point of sale (POS) terminal. The magnetic stripe reader reads the account number from the magnetic stripe, and this account number is then transmitted by the POS terminal with a transaction authorization request to an acquirer financial institution for transaction processing.

Payment card-based transactions can be performed across multiple channels of commerce. As mentioned above, a card-based transaction may be performed in person at a point of sale terminal in a retail store, or may be performed via a computer connected to the internet, via a mobile phone and/or via a company-based call center (e.g., a 1-800 number for a catalog company). These various transactions are conducted in different ways and, accordingly, have different levels of fraud risk. In addition, transactions generally require that the consumer have his or her card in hand to either present to the cashier in a retail environment, or to enter the requested information via the internet and/or over the telephone. To attempt to reduce the risk of cloned physical cards, the merchant is requested to verify certain physical attributes of the card that are designed to make card cloning more expensive for the fraudster. The risk of financial fraud is greater during remote transactions (also known as "card not present," or "CNP" transactions) because there is less ability for the merchant to verify the authenticity of the card and the identity of the cardholder. Examples of CNP transactions include, but are not limited to, internet or on-line purchases, telephone, fax, and mail order transactions, purchases made via merchant applications on an electronic device, and other e-commerce transactions.

The magnetic stripe on conventional payment cards include up to three tracks of data, which are known as Tracks 1, 2, and 3, and these tracks are formatted according to the ISO7813 standard. Track 3 is typically unused and, due to the size of current magnetic stripes, is often not even physically present on most magnetic stripe cards. Thus magnetic stripe card readers typically read Track 1 and/or Track 2 data to obtain the minimum cardholder account information needed to complete a transaction, such as a purchase transaction at a merchant retail store. Track 1 is capable of storing more information than Track 2, and may also contain alphabetic text. Thus, the Track 1 data conventionally includes the cardholder's name. The Track 1 layout consists of a start sentinel (SS), a Format Code (FC), a primary account number (PAN) which is typically 16 digits but can be up to 19 digits and may match a credit card number, a Field Separator (FS), a cardholder name (which can be up to twenty-six (26) alphanumeric characters), another FS, an expiration date (four characters in the form YYMM), a service code (three characters), discretionary data (which may include a Pin Verification Key Indicator (PVKI, 1 character), a PIN Verification Value (PVV, 4 characters), a Card Verification Value or Card Verification Code (CVC1, 3 characters), an end sentinel (ES), and a longitudinal redundancy check (LRC) that is a validity character calculated from other data on the track. Track 2 data was developed by the banking industry (ABA), and includes a start sentinel, a primary account number (PAN) of up to 19 characters that may match the credit card number printed on the front of a payment card, a separator, an expiration date (four characters in the form YYMM), a three digit service code (wherein the first digit specifies interchange rules, the second digit specifies authorization processing, and the third digit specifies the range of services), discretionary data (which may be, but frequently is not, the same as for Track 1), an ES, and a longitudinal redundancy check (LRC).

When the magnetic stripe on a payment card is swiped through a magnetic stripe reader, the static data encoded on Track 1 and Track 2 is read. As mentioned above, one of the fields of the Track 1 data is the Card Validation Code (CVC1), which CVC1 data is encoded during a personalization process. The CVC1 data is used for card present transactions, and serves as a cryptographic integrity check on the track contents. Thus, the CVC1 simplifies the process of authenticating track data when it is received by the issuing bank. It also prevents easy fabrication of credit cards: while track data is relatively predictable given the card number, expiration date and other fields, the CVC1 data cannot be derived from other track data without having access to a cryptographic key which is not present in the track data or anywhere else on a payment card. In addition, CVC1 data is only used for a card present or swipe transactions, and cannot be used for a card not present (CNP) transaction.

Proximity payment devices and systems are becoming increasingly popular. One such system is the "PayPass®" system operated by MasterCard International Incorporated, the assignee hereof. MasterCard® issuer financial institutions now have the option of issuing PayPass® payment devices to their cardholders. Proximity payment devices typically include a secure microprocessor and data storage device or chipset (also referred to as a radio frequency identification chip), and an antenna. Both the radio frequency identification chip and the antenna may be embedded in the body of the proximity payment device, which may have the same shape and dimensions as a conventional payment card such as a credit card or a debit card. Such proximity payment devices may also have the shape of another type of form factor, such as a fob, key ring, wristband, or the like.

Some proximity payment device embodiments consist of a radio frequency identification (RFID) chip (or payment chipset) and antenna embedded within a consumer's mobile device, such as a Smartphone, tablet computer, digital music player, and/or personal digital assistant (PDA). The RFID chip may store an account number to be wirelessly transmitted from the proximity payment device (via the antenna) when the payment device is presented for proximity coupling to a reader device associated with a point-of-sale terminal. In one approach, near field communication (NFC) technology is used to securely transmit payment credentials from the consumer's mobile device to an NFC reader device associated with a merchant's POS terminal. In such cases, a secure element (SE) chip included as part of the consumer's mobile device can be utilized.

Payment systems that accept proximity payment devices provide measures to ensure that primary account numbers (PANs) are protected from access by wrongdoers, and an important initiative to prevent any unauthorized access to PANs involves using "tokenization." Tokens may be defined as surrogate values that replace PANs in part of a payment system. Thus, according to one use case set forth in the Payment Token Interoperability Standard (issued by MasterCard International Incorporated (the assignee hereof), Visa and American Express in November 2013), a mobile device with NFC capabilities is "tokenized" or provisioned with a token. The consumer's mobile device may wirelessly pass the token and payment information via NFC to the merchant's POS terminal. An authorization request is originated from the POS terminal and routed via an acquiring financial institution to a token service provider. The authorization request includes the token and other information, including an indication that the transaction was initiated via an NFC read at the POS terminal.

The token service provider maintains a secure database (or "vault") that maps tokens to associated PANs. In the above example, the token service provider recognizes that the token in the authorization request is intended for use only in NFC transactions at the point of sale, and thus the use of the token is authorized. The token service provider then replaces the token with the corresponding PAN (which the token represents) and routes the authorization request (including the PAN and other information) to the issuer of the payment card account identified by the PAN. In this use case, the token itself is of relatively little value to a wrongdoer. In particular, if a thief embodies the token into a counterfeit magnetic stripe payment card, such a counterfeit card would not be usable in a transaction because the token would be rejected if presented in a magnetic stripe "swipe" transaction, or in any other type of transaction that is not initiated via NFC at a point of sale terminal. In addition, during a transaction the microprocessor of a proximity payment device generates a unique dynamic cryptogram using the transaction data and a cryptographic key. The cryptographic key was provisioned to the proximity payment device during a personalization process (or during subsequent management of the device during use) and may be stored in a secure memory. Accordingly, the unique dynamic cryptogram generated by the proximity payment device is transmitted to the card issuer along with the transaction data during transaction authorization processing. The card issuer uses its keys and codes to calculate a cryptogram based on the same transaction data. Alternatively, the service provider's system (for example, a digital enablement service computer system) may validate the dynamic cryptogram. If the dynamic cryptogram received from the proximity payment device matches the calculated cryptogram, the issuer or the digital enablement service then knows that the transaction data was received from a valid proximity payment device and proceeds with authorization processing. Due to such security measures (tokenization and the use of dynamic cryptograms), transactions conducted with proximity payment devices, such as payment-enabled mobile devices, are generally more secure than transactions conducted with conventional magnetic stripe credit cards and/or debit cards.

However, many merchants and payment account issuer financial institutions use systems that are not configured to process contactless payment transactions. In fact, about twenty-one (21) million merchants world-wide have only magnetic stripe acceptance systems and lack NFC-enabled point of sale terminals. This lack of NFC-enabled point of sale terminals by merchants means that many consumers who possess payment-enabled mobile devices (such as payment enabled Smartphones) cannot take advantage of the secure and convenient NFC technology. This may negatively affect merchants who may lose sales, consumers who are unable to conduct contactless transactions using their contactless mobile devices, and account issuers who may lose the business of some account holders who decide to switch to an issuer capable of processing contactless transactions.

Accordingly, there is a need for a bridge technical solution to enable consumers to use their contactless payment devices (particularly consumer mobile devices that include payment circuitry) to securely conduct magnetic stripe card transactions that does not require significant changes to legacy systems, such as the magnetic stripe readers (and/or other communications interfaces) associated with merchant point-of-sale (POS) devices and issuer processing systems.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein.

DETAILED DESCRIPTION

In general, and for the purpose of introducing concepts of embodiments of the present disclosure, a proximity payment device and/or mobile device is configured for generating dynamic data in a one-way communication, and for using Track 1 and Track 2 data to conduct transactions in a manner that emulates payment by a magnetic stripe payment card. Thus, the proximity payment devices and methods disclosed herein solve the technical problem of how to utilize contactless payment devices or proximity payment devices (particularly consumer mobile devices that include payment circuitry, such as smartphones and/or table computers) to conduct secure transactions utilizing magnetic stripe technology in a manner that does not require significant changes to legacy systems. Thus, the methods and apparatus disclosed herein provide magnetic stripe card data to a communication interface to initiate a transaction. For example, a cardholder can utilize his or her payment-enabled smartphone to conduct a purchase transaction at a merchant retail location via communications with a magnetic stripe reader associated with the merchant's point-of-sale (POS) device and issuer processing systems.

Figure 1:
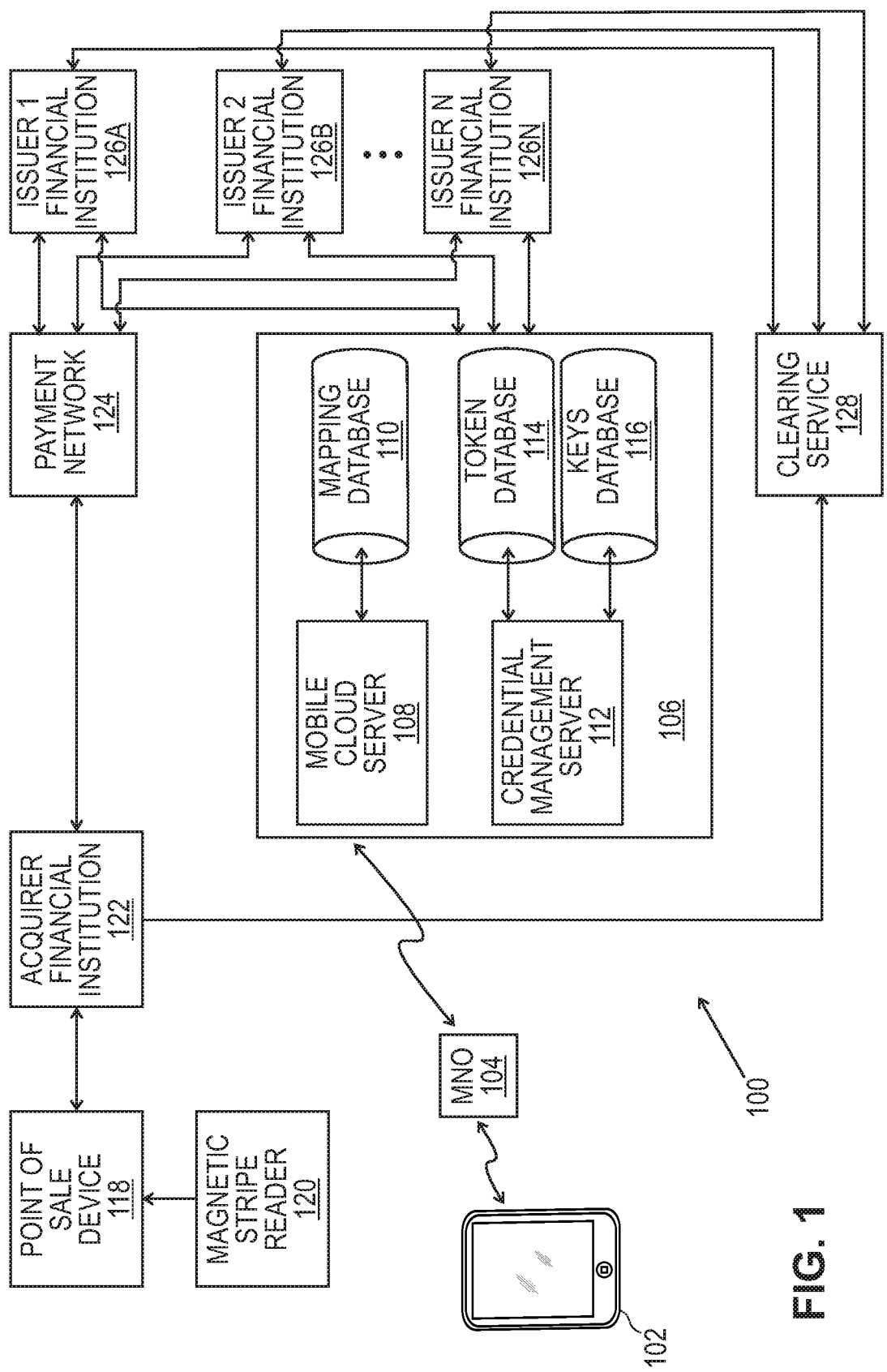
FIG. 1 is a block diagram that illustrates a transaction processing system according to some embodiments of the disclosure.

FIG. 1 is a block diagram of a simulated magnetic stripe payment card account registration and transaction processing system 100 according to some embodiments. The system 100 is configured for processing transactions and for enrolling proximity payment devices, such as the mobile device 102, of payment card account holders or cardholders with a digital enablement service 106 to enable such proximity payment devices to emulate magnetic stripe cards to conduct transactions, such as payment and/or purchase transactions. The mobile device 102 may be any type of mobile computing device suitable for performing the functions as disclosed herein, including, but not limited to, a cellular phone, a smartphone, a tablet computer, a laptop computer, a digital music player, a key fob, a proximity payment card, and the like. In some embodiments, the mobile device 102 includes a secure element (not shown) that is tamper-resistant and configured for securely storing data. In some implementations, the secure element is a hardware chip or chipset, and may store one or more cryptographic keys. The cryptographic keys may be provisioned to the secure element at the time of the manufacture of the mobile device 102, or via an over-the-air (OTA) provisioning method controlled by, for example, a payment card account issuer financial institution (FI).

Referring to FIG. 1, the system 100 includes a merchant point of sale (POS) terminal 118 which includes an associated magnetic stripe reader 120, which may be located at a merchant retail store. The magnetic stripe reader 120 is configured for reading payment card account data from a cardholder's magnetic stripe card (not shown) or from a cardholder's payment enabled mobile device 102 which is configured to emulate or mimic transmission of magnetic stripe Track data to conduct a purchase transaction. For example, U.S. Published Application No. 2013/0256397 filed on Mar. 30, 2012 entitled "Systems and Methods for Waveform Transmission of Transaction Card Data" discloses examples of cardholder mobile devices which include components for generating and transmitting a changing magnetic field to a merchant's point of sale magnetic stripe reader to conduct a purchase transaction. U.S. Published Application No. 2013/0256397 is incorporated by reference in its entirety herein.

During a purchase transaction, the magnetic stripe reader 120 provides the Track 1 and/or Track 2 data to the POS device 118 for purchase transaction processing. In particular, the POS device 118 transmits the cardholder's payment card credentials (received, for example, via magnetic induction from a cardholder's proximity payment device) and other transaction information to an acquirer financial institution (FI) 122, such as an acquiring bank operating as or on-behalf-of the merchant. The acquirer FI 122 then generates and submits an authorization request for the purchase transaction along with the cardholder's credentials to a payment network 124. In accordance with conventional practices, the payment network 124 may be operated by, or on behalf of, a payment card association (of which a prominent example is MasterCard International Incorporated, the assignee hereof) to provide the required central switching and message routing functions among the member financial institutions of the payment card association. In the system 100, the payment network 124 is configured for communications with a plurality of issuer FIs 126A to 126N, and thus determines the appropriate issuer FI (which issued the cardholder's payment card account) to transmit the authorization request. If the appropriate issuer FI (for example, issuer FI 126B) authorizes the purchase transaction, then the payment network 124 forwards the authorization request to the acquirer FI 122, which transmits the authorization to the merchant's POS device 118 to consummate the purchase transaction. The cardholder (consumer) then may leave the merchant's retail store with the items or merchandise (or obtain a desired service).

In some implementations, the acquirer FI 122 also transmits the authentication request and associated data to a clearing service 128. The clearing service 128 operates to clear the purchase transaction by identifying the appropriate issuer FI 126B, and then credits an account at the acquirer FI (associated with the merchant) with the transaction amount and debits the cardholder's account (held by the issuer FI 126B) while also accounting for all transactions fees. Such a clearing service 128 may be, for example, the MasterCard Clearing Management System operated by MasterCard International Incorporated, the assignee hereof.

Although only one mobile device, one POS terminal, one magnetic stripe reader, and one acquirer FI are shown in FIG. 1, it should be understood that in practice the system 100 may include a large number of mobile devices or proximity payment devices, POS terminals, magnetic stripe readers, and acquirer FIs. In particular, the drawing only shows components that are active in connection with a single transaction out of a large number of transactions that may be handled by the payment network 124 on an ongoing basis. Of course, the system 100 may also be configured to handle payment cards that are not proximity payment devices.

As mentioned above, the apparatus and methods disclosed herein allows a cardholder who has a proximity payment device to securely purchase goods or services from a merchant who does not have a contactless reader device but instead has a magnetic stripe reader 120. In order to accomplish this, a cardholder must first enroll or register his or her proximity payment device (such as mobile device 102) with the digital enablement service 106. Referring again to FIG. 1, in some embodiments the digital enablement service 106 includes a mobile cloud server computer 108 operably connected to a mapping database 110 and to a credential management server computer 112. The credential management server computer 112 may also be operably connected to a token database 114 and a keys database 116. In order to enroll his or her proximity payment device with the digital enablement service 106, the cardholder or consumer utilizes a wallet application residing on his or her mobile device 102 to transmit the consumer's primary account number (PAN), billing address, and security information (such as a CVC2 code) via a Mobile Network Operator (MNO) 104 to the Digital Enablement Service 106 for validation. In some implementations, when the Digital Enablement Service 106 receives the registration request from the mobile device 102 via the MNO 104, the mobile cloud server 108 determines which issuer FI issued the mobile payment account to the cardholder, and then transmits the PAN information to that issuer FI for validation, and receives a validation response. In some cases, the digital enablement service may be configured to perform cardholder validation on behalf of the issuer. Accordingly, when the mobile cloud server receives a validation indication regarding cardholder's account from the cardholder's issuer FI, a token (or mobile device PAN) and a card key are then created and transmitted to the wallet credential management server 112 (or, in an alternate embodiment, to a trusted service manager (TSM), not shown). The token and single use and/or session keys (derived from the card key) are then transmitted (either by the digital enablement service 106 or the TSM) to the wallet application which is running on the cardholder's mobile device 102. In some implementations, the cardholder may be required to activate his or her simulated magnetic stripe payment card account by, for example, responding to a text message from the issuer FI to confirm registration or enrollment. In some implementations the card key may be transmitted to the wallet application or a trusted store such as a Trusted Execution Environment (TEE) or Secure Element (SE) on the cardholder's mobile device 102.

Figure 2:
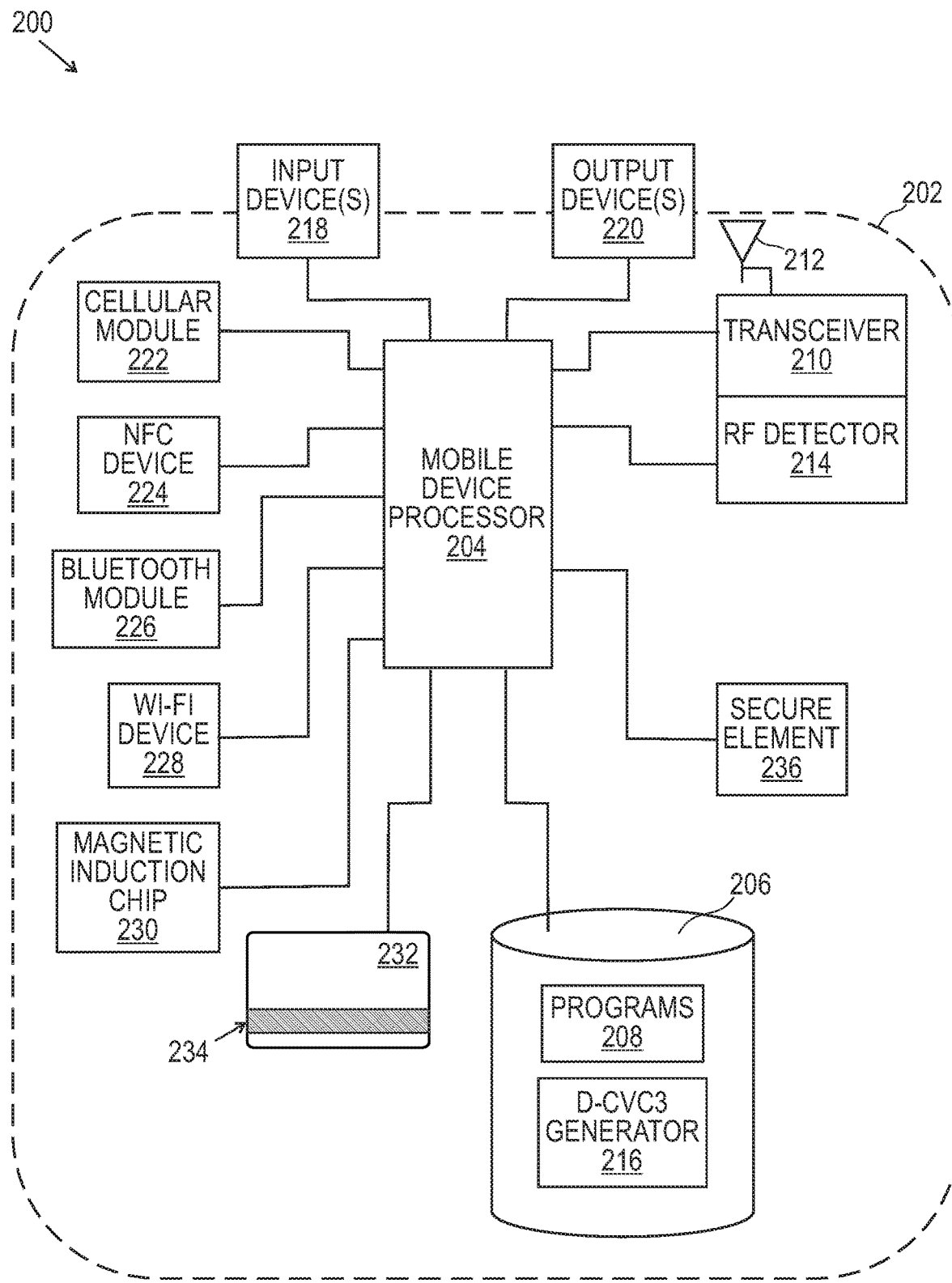
FIG. 2 is a block diagram of an embodiment of a multifunctional mobile device having communications capabilities and configured to operate in accordance with aspects of some of the embodiments of the disclosure.

FIG. 2 is a block diagram of an embodiment of a multifunctional mobile device 200 having communications capabilities and configured to operate in accordance with aspects of some embodiments disclosed herein. The multifunctional mobile device 200 may be, for example, a mobile or cellular telephone or a tablet computer having wireless communications capability including a short-range wireless communication capability and may be battery powered (not shown). It should be understood that FIG. 2 is illustrative only, and thus does not necessarily represent a physical layout of any particular mobile device and does not necessarily depict all circuit components. The mobile device 200 may include hardware, software, firmware, and/or combinations thereof to implement and embody aspects of the present disclosure, including the methods and/or processes disclosed herein.

The multifunctional mobile device 200 may include a housing 202 (shown in dotted line) that contains and/or supports the various components, for example, of a mobile telephone. The housing 202 may, for example, be shaped and sized so as to be held in the palm of a cardholder's or consumer's hand. However, in some other embodiments, the housing 202 may be larger (or smaller) depending on the type of mobile device, for example, a tablet computing device housing, a key fob housing, a digital music player housing, or other form factor housing.

The mobile device 200 includes a mobile device processor 204 that processes and controls data in the mobile device. The mobile device processor 204 may be a specially designed processor circuit (for example, it may be a low-power consumption processor circuit) and is operably connected to a mobile device memory 206 (that in some embodiments may be part of a secure element or "SE" 236). The mobile device memory 206 stores, for example, program instructions 208 and a dynamic CVC3 generator 216 (which is explained below) that may be utilized by the mobile device processor 204. The mobile device processor 204 is also operably connected to a transceiver 210 for transmitting and receiving communication signals to and/or from antenna 212, and a radio frequency (RF) detector 214 that is part of the transceiver and used to detect RF signals. In some embodiments, the transceiver 210 and antenna 212 are configured to transmit and to receive wireless wide-range and/or short-range communication signals. Though not separately depicted in FIG. 2, the memory 206 may include or encompass, in various embodiments, random access memory (RAM), read only memory (ROM), a SIM card, flash memory, non-volatile memory, and/or other types and forms of non-transitory computer readable media or data storage devices.

The mobile device 200 may also include one or more input device(s) 218 such as a microphone, a keypad, a keyboard, a reader component (for example, a fingerprint reader), a sensor, a camera, a touchscreen system, and the like for receiving input. The mobile device 200 may also include one or more output device(s) 220, for example, a speaker, an indicator light, a display (such as a touch screen), and the like for providing output.

The transceiver 210 operates to transmit, via antenna 212, voice signals received from a user or cardholder through input device 210, and operates to reproduce, via output device 220 (e.g., a speaker), voice signals received via the antenna 212. Transceiver 210 may also further operate to handle transmission and reception of text messages and/or other data communications via antenna 212. In some embodiments, the mobile device 200 may transmit wireless communication signals in any frequency range and power, including those now used and those that may be used in the future without limitations.

The mobile device 200 may be capable of communicating with another device via cellular telephone signals as provided by a cellular component or module 222 and via a variety of communication devices functioning in accordance with short-range communication protocols. In particular, the mobile device may communicate via NFC signals as provided by a NFC device or component 224 or the like, via a Bluetooth® protocol as provided by a Bluetooth® module 226, and/or by output signals via a wireless local area network (e.g., Wi-Fi, based on IEEE 802.11 b/g/n or other standards) as provided by a Wifi device 228. The mobile device 200 may also include a magnetic induction chip 230 that, under control of the mobile device processor 204 and in accordance with processes disclosed herein, can wirelessly transmit payment card account data when placed near a magnetic stripe reader. In some embodiments, the mobile device 200 may also include a magnetic stripe component 232, which may be a "pop-out" magnetic stripe component, that may be operably connected to the mobile device processor 204 and that includes a magnetic stripe 234. The magnetic stripe 234 can be used by a cardholder to swipe through a magnetic card reader during a transaction. In some implementations, the magnetic stripe 234 is utilized to hold track data and dynamic card validation code data (such as CVC3 data) generated by and encoded onto the magnetic stripe 234 by the magnetic induction chip 230 (as explained below). The pop-out magnetic stripe component 232 may be configured for physical storage within the housing 202 when not in use, and operable to be cantilevered outward from (or swiveled outside) the housing 202 to expose the magnetic stripe 234 such that it can be easily swiped through a magnetic card reader (not shown), for example, that is associated with a point-of-sale terminal of a merchant.

In some embodiments, the mobile device 200 may be provided with a companion device (not shown) having magnetic induction capability, or a pop-out magnetic stripe component as described above. In some implementations, the mobile device 200 generates the required data for a transaction (for example, track data and dynamic card validation code data) and transmits it to the companion device via the Bluetooth® module 226, or by utilizing other wireless technology.

Accordingly, the processes disclosed herein may be implemented by the components of the mobile device 200. For example, in some embodiments, the dynamic CVC3 generator 216 may be invoked to generate a CVC3 value under the control of the mobile device processor 204 and programs 208 just prior to conducting, or when initiating, a transaction. CVC3 is a cryptogram generated by the mobile device 200 uniquely for each transaction and is created by applying a cryptographic function (message authentication code or "MAC") with the card key (or session keys which may be used when the proximity payment device does not include a secure element (SE) 236) to a set of data unique to the transaction. (In some embodiments, the card key is securely provisioned to and stored in the mobile device during the enrollment process.) Since the proximity payment device 200 cannot conduct two-way communications with a merchant's point of sale (POS) terminal 118 and associated magnetic stripe reader 120 (see FIG. 1) upon initiating a transaction, an unpredictable number (UN) which is typically provided by the POS terminal is instead generated by the mobile device 200. In some implementations, a time stamp generated by the mobile device may be utilized as the UN for a transaction, and the UN is utilized to generate the CVC3 for use in authentication processing. For example, at the time of a transaction the mobile device 200 generates a time stamp (which may be, for example, a number based on the hour and/or minute and/or second and/or date of the transaction) which is then used as the UN for generation of the CVC3. Thus, upon receipt of the CVC3 value (or cryptogram) during authentication processing, the authentication system or the digital enablement service 106 (FIG. 1) re-computes the CVC3 and compares it to the value received, and if the UN (the timestamp) provided by the mobile device is within a predetermined threshold amount (or range) of the time stamp provided by the merchant's POS terminal for that transaction, then the authorization system validates that the timestamp is current and permits further transaction processing. In some embodiments, the UN (timestamp) may also be obfuscated and made transaction dependent so that a wrongdoer (such as a thief) cannot easily observe or make use of the time value. It should be understood that in some other embodiments a mobile device may be configured to generate a number for use as the UN that is not based on a timestamp.

Thus, in embodiments according to the present disclosure, the mobile device 200 may be considered as both an NFC-enabled mobile device equipped to operate as a secure proximity payment device, and as a mobile device equipped to emulate or mimic or simulate a magnetic swipe payment card to conduct purchase transactions using emulated magnetic stripe data via a communications interface (such as a magnetic stripe reader) associated with, for example, a merchant's POS terminal. Thus, a contactless reader device and the mobile device 200 may typically be positioned in close proximity of each other when communicating using NFC signals. Similarly, it may be required to bring the mobile device 200 into close proximity to a magnetic stripe reader during a purchase transaction so that emulated magnetic stripe transaction data may be communicated via magnetic induction from the magnetic induction chip 230 to a magnetic stripe reader. In the same way that NFC signals may be picked up at a distance from the reader, a fraudster may also be able to pick up information from the magnetic induction communication process and thus there is a need to protect against such eavesdropping by the use of dynamic data.

A user or cardholder may obtain a mobile wallet application (or mobile wallet "app") by utilizing the mobile device 200 to download such a mobile wallet app from an issuer, an app store or app service compatible with the mobile device, or from a third party to their mobile device. After downloading the mobile wallet app, the consumer may be prompted to activate the payment functionality by responding to a text message (or other type message) from the issuer FI regarding his or her payment account. The mobile wallet app then uses a built-in terminal kernel, which is a software program capable of interacting with a mobile payment application (or the SE 236) to generate the Track 1 and Track 2 data including the CVC3 data, as explained herein. In particular, the built-in kernel generates the unpredictable number or UN (having a length nUN as defined, for example, by the PayPass™ protocol) that is used to generate the dynamic CVC3, and also generates the application transaction counter (ATC). Thus, the CVC3 may be generated in accordance with the PayPass™ standard for proximity payment devices. A description of the dynamic CVC3 security code is contained in a paper entitled "PayPass Information Paper: ATC Regeneration and Tracking" (Version 1.4) published by MasterCard International Inc. on Oct. 26, 2004, and hereby incorporated herein by reference.

To briefly summarize aspects of the dynamic CVC3 feature, in some embodiments the mobile device 200 is configured to perform a cryptographic calculation to generate the CVC3 for a particular transaction based on the following inputs: (a) a cryptographic key, (b) the unpredictable number ("UN") generated by the built-in terminal kernel of the wallet application of the mobile device, (c) a transaction count value maintained in the mobile device to indicate how many transactions the mobile device has been used for, and (d) certain static data stored in the mobile device.

In some embodiments, however, the UN may be generated by a trusted execution environment ("TEE") such as the secure element 232 by the mobile device processor 204 and signed with a key shared between the secure element 232 and a Transaction Management System ("TMS"). The TMS is part of a digital enablement service (such as the digital enablement service 106 of FIG. 1) involved in the authorization process, and operates to validate the CVC3, map the token to the real PAN, and forward the transaction to the issuer authorization system for financial validation of the transaction.

In accordance with some embodiments, in order to conduct a purchase transaction the mobile device processor 204 functions to arrange transaction data into an ISO 7813 Track 1 and Track 2 data format which may include a start sentinel, data that represents the token (or device PAN received during registration), the token expiration date, a placeholder cardholder name in Track 1 (which may be, for example, the phrase "Not Available" or a string such as "/"), a service code indicating that "no chip is available on the card," the dynamic CVC3 data, Unpredictable Number (UN), ATC, and an end sentinel. The data in the ISO 7813 Track 1 and Track 2 data format is then transmitted to a magnetic stripe reader associated with a merchant's POS terminal via the magnetic induction chip 230 (by bringing the mobile device 200 into close proximity with the magnetic stripe reader), or via a pop-out magnetic stripe 232, or via a companion card, and the like. Upon receipt of the ISO 7813 Track 1 and Track 2 data, the merchant's POS terminal submits a transaction authorization request as a swiped payment card transaction to the acquirer FI, which also transmits the transaction as a swiped payment card transaction to the payment network for further processing.

It is contemplated, however, that other methods may also be utilized for transmitting the ISO 7813 Track 1 and Track 2 transaction data from a proximity payment device to a magnetic stripe reader. For example, in some embodiments, the proximity payment device may also include a magnetic stripe that has been encoded via processes described herein and is configured for swiping through a magnetic card reader. In another implementation, a companion device with a magnetic stripe may include circuitry capable of receiving the ISO 7813 Track 1 and Track 2 data from the proximity payment device and writing it to the magnetic stripe, which can then be swiped through the merchant's magnetic card reader. In yet another embodiment, a companion device may be provided for use with the proximity payment device, wherein the companion device includes hardware and/or software capable of receiving the ISO 7813 Track 1 and Track 2 transaction data generated by the proximity payment device via wireless technology and then transmitting that data via magnetic induction to a magnetic stripe reader. Thus, the magnetic reader receives the ISO 7813 Track 1 and Track 2 transaction data (in any manner described herein) and transmits it to the merchant's POS terminal, which then submits a transaction authorization request as a swiped payment card transaction to the acquirer FI. The acquirer FI then also transmits the transaction as a swiped payment card transaction to the payment network for further processing.

In some embodiments, the payment network intercepts the "swiped card" authorization message based on the token bank identification number ("BIN") and validates that the POS entry mode is valid. In particular, in some implementations an acceptable value in Data Element 22, Subfield 1 is "90" to indicate PAN auto-entry via magnetic stripe. The payment network then validates the CVC3 cryptogram present in the discretionary data, validates the UN (in the scenario where it was signed, or if it's a time stamp then it is checked to ensure that it is current as explained above), maps the token back to the PAN (to determine the issuer by using the leading digits of the PAN which correspond to bank identification numbers (BINs) that identify the issuing FI), and forwards the authorization with the dynamic CVC3 cryptogram validation result to the issuer FI. Normal purchase transaction authorization and clearing processing then occurs.

Figure 3:
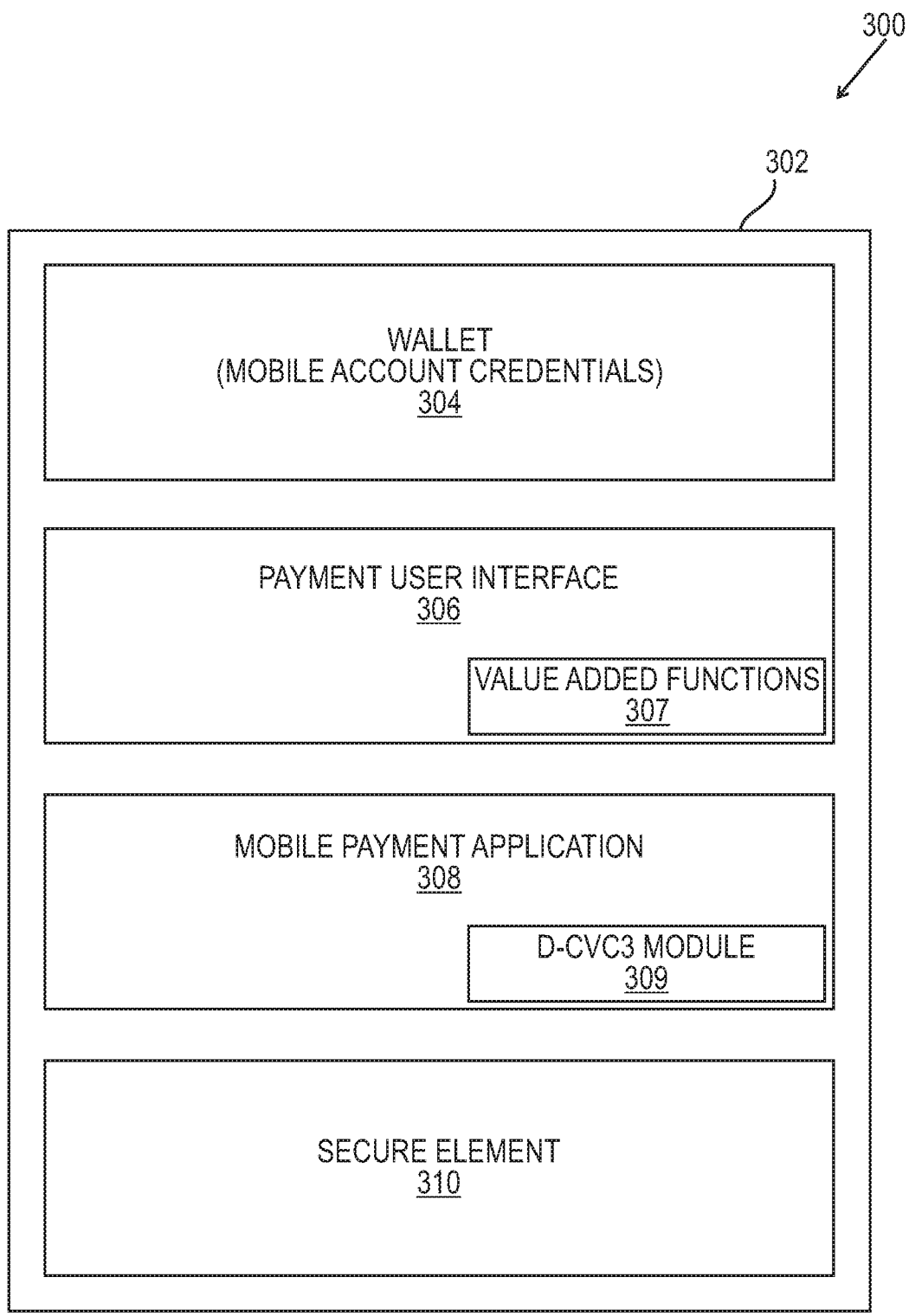
FIG. 3 is a block diagram illustrating data stored in a mobile device in accordance with some embodiments of the disclosure.

FIG. 3 is a block diagram 300 to illustrate data stored in a mobile device for use in conducting magnetic stripe transactions in accordance with some embodiments. In particular, the mobile device 302 may include a mobile wallet 304, which may be an electronic wallet configured to store and transmit payment credentials for one or more payment card accounts. The use of electronic wallets to store and transmit payment credentials will be apparent to persons of skill in the art. The mobile account credentials may include at least a token (or mobile PAN) for each mobile payment card account and one or more sets of cryptographic keys.

The mobile device 302 may also include a payment user interface (UI) 306. The payment UI 306 may include an interface provided for the user or cardholder for management of a mobile payment application 308. The mobile payment application 308 may be an application program for execution by a mobile device processor of the mobile device. In some embodiments, the mobile payment application 308 includes a dynamic CVC3 module 309 for generating the dynamic CVC3 data as disclosed herein. The mobile payment application 308 may provide security for the functions performed by the mobile device, and may facilitate communications between the internal components of the mobile device as well as external communications. The payment UI 306 and/or the mobile payment application 308 may be downloaded and/or installed to the mobile device using various methods and/or systems, such as downloading of application data from an application store via the internet.

Referring again to FIG. 3, the mobile device may include a secure element 310 (but this is not present in some embodiments). As discussed herein, the secure element 310 may be a tamper-resistant platform, such as a hardware chip. The secure element 310 may store a master key identifier (cryptographic key), the token or PAN, card profile and payment credentials, and/or other data, which may be stored in separate portions of the secure element 310.

In some embodiments, the payment UI 306 may include additional functionality, such as value added functions 307. The value-added functions 307 may be configured to provide the user of the mobile device 302 with additional capabilities, such as the capability of applying coupons or loyalty points to purchase transactions conducted using the mobile device 302, or for receiving offers or discounts, and the like.

Figure 4:
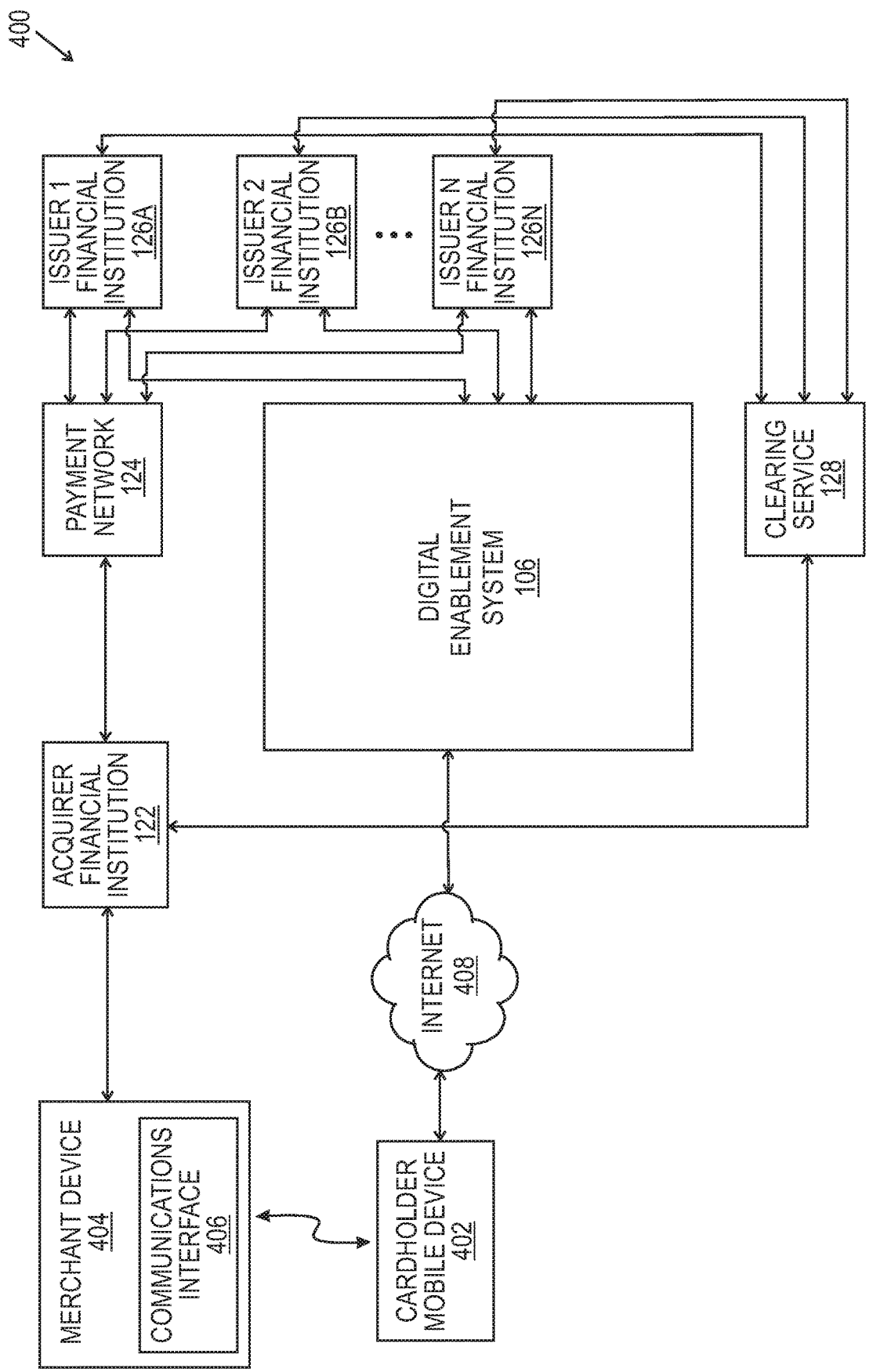
FIG. 4 is a block diagram of another of a contactless mobile device and payment card account registration and transaction processing system according to some embodiments of the disclosure.

FIG. 4 is a block diagram of an embodiment of a contactless mobile device and payment card account registration and transaction processing system 400 according to some embodiments disclosed herein. The system 400 is configured for enrolling proximity payment devices of cardholders, such as the cardholder mobile device 402 of a payment card account holder (cardholder) with a digital enablement service 106 (See also, FIG. 1), and for enabling such proximity payment devices to emulate magnetic stripe card data for use in conducting transactions, such as payment and/or purchase transactions. The mobile device 402 may be any type of mobile computing device suitable for performing the functions as disclosed herein (as explained above). In some embodiments, the mobile device 402 includes a secure element (not shown) that is tamper-resistant and configured for securely storing data, and such a secure element may be a hardware chip or chipset. The secure element may store one or more cryptographic keys.

The system 400 also includes a merchant device 404 having a communications interface 406, which may be used at many different types of merchant locations, such as a farmer's market, merchant's bazaar, garage sale, and/or retail store. The merchant device may be a mobile device, such as a smartphone and/or a tablet computer and the like, and the communications interface is configured to receive input data from a cardholder's mobile device. In this example, the communications interface 406 is not a magnetic stripe reader. Instead, examples of a suitable communications interface 406 include, but are not limited to, a microphone (to receive audio input), a camera (to receive visual input), an optical sensor (to receive optical data, such as light data from an LED or other source associated with a consumer mobile device, such as a camera flash component), a quick response (QR) reader (for receiving and/or reading a QR code which can be generated and displayed by a cardholder's mobile device), a radio frequency (RF) receiver (for receiving RF signals), other types of sensors for receiving data input, and/or the like.

The communications interface 406 is configured for reading payment card account data from a cardholder's payment enabled mobile device 402, which is configured to transmit data that emulates magnetic stripe Track data to conduct a purchase transaction. For example, during a purchase transaction, the communications interface 406 receives simulated magnetic stripe input data corresponding to Track 1 and/or Track 2 data, which is then transmitted by the merchant device 404 to an acquirer financial institution (FI) 122, such as an acquiring bank operating as or on-behalf-of the merchant. As explained above with regard to FIG. 1, the acquirer FI 122 then generates and submits an authorization request for the purchase transaction along with the cardholder's credentials to a payment network 124, which determines which of the issuer financial institutions (FI) 126A to 126N is the appropriate issuer FI to transmit the authorization request. If the appropriate issuer FI (for example, issuer FI 126A) transmits an authorization response to the payment network, then the payment network 124 forwards the authorization to the acquirer FI 122, which transmits the authorization to the merchant's device 304 to consummate the purchase transaction. The cardholder (consumer) may then take possession or the item(s) or merchandise (or obtain a desired service).

As explained above with regard to FIG. 1, in some implementations the acquirer FI 122 also transmits the authentication request and associated data to a clearing service 128, which then operates to clear the purchase transaction. In particular, the clearing service identifies the appropriate issuer FI 126A, credits an account at the acquirer FI 122 (associated with the merchant) with the transaction amount, debits the cardholder's account at the issuer FI 126A, and accounts for all transaction fees.

As also mentioned above, for secure transaction processing to occur, the cardholder must first enroll or register his or her proximity payment device (cardholder device 402) with the Digital Enablement service 106 (See also, FIG. 1). In some embodiments, the cardholder's mobile device transmits, via the Internet 408, enrollment information such as the cardholder's primary account number (PAN), billing address, and security information (such as a CVC2 code) to the Digital Enablement service 106 for validation. In some implementations, when the Digital Enablement service 106 receives the registration request from the mobile device 402 via the Internet 408, a mobile cloud server 108 (not shown in FIG. 3, but see FIG. 1) determines which issuer FI issued the mobile payment account to the cardholder, and then transmits the PAN information to that issuer FI for validation. When a validation response is received, the Digital Enablement service computer 106 conducts further processing in accordance with the examples provided herein to enroll the cardholder's mobile device 402. For example, the cardholder's mobile device processor may receive, from the digital enablement service, an enrollment or registration verification along with a token and single use key or limited use key or device master key for use to generate simulated magnetic stripe payment account data when initiating transactions with merchants. In some implementations, the cardholder may be required to activate the simulated magnetic stripe payment card account for his or her mobile device 402 by, for example, responding to a text message from the issuer FI to confirm registration or enrollment.

Figure 5:
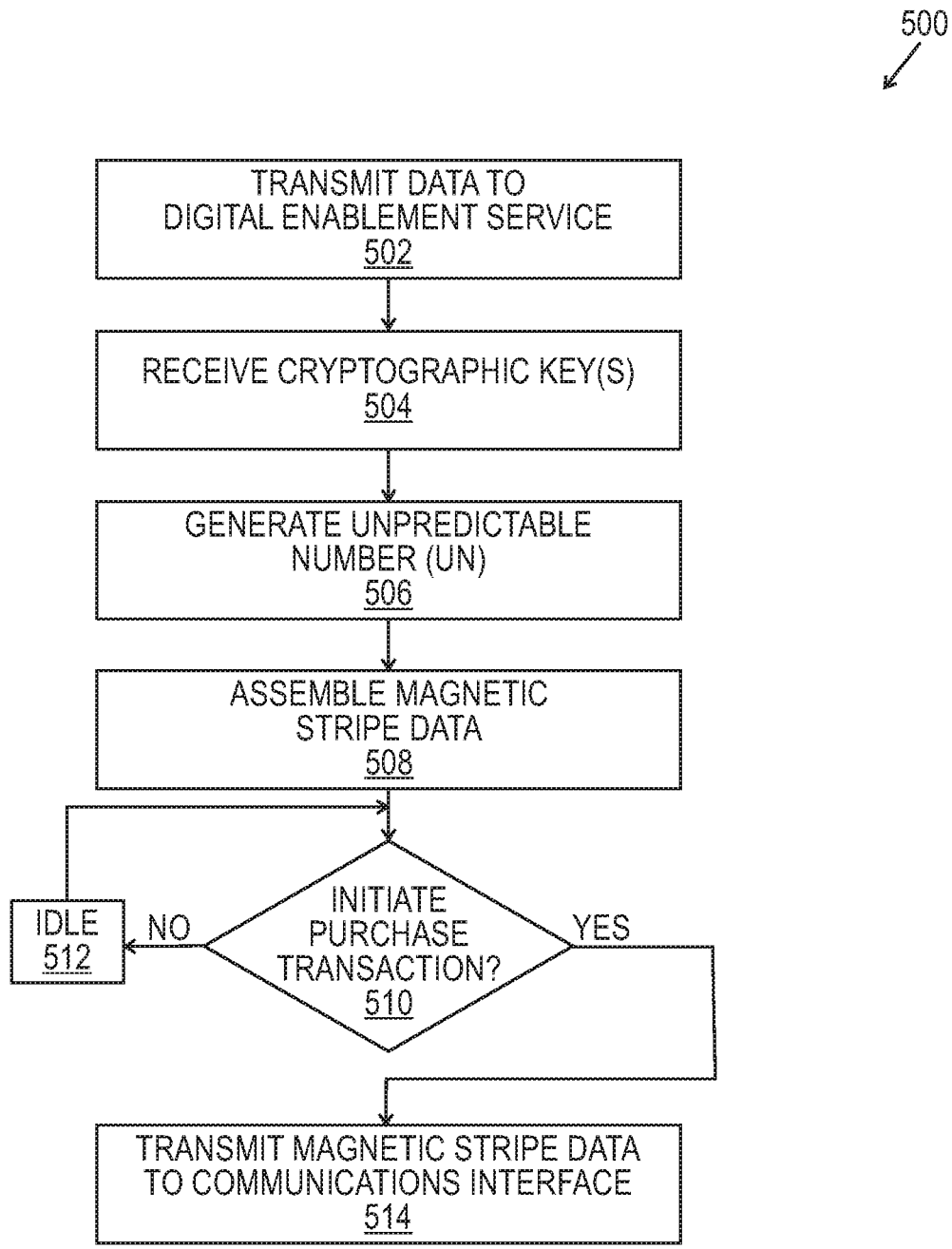
FIG. 5 is a flowchart illustrating a simulated magnetic stripe payment data process for use by a proximity payment device in accordance with some embodiments of the disclosure.

FIG. 5 is a flowchart illustrating a simulated magnetic stripe payment data process 500 for use by a proximity payment device in accordance with some embodiments. The process begins when a mobile device processor of a cardholder's mobile device transmits 502 to a digital enablement service computer, information or data to activate a simulated magnetic stripe payment wallet application stored in a memory of the mobile device, and then receives 504 at least one cryptographic key. The mobile device processor then generates 506 an unpredictable number (UN), then generates 508 dynamic CVC3 data based on the UN, and assembles magnetic stripe data 508 for use in a purchase transaction. If a purchase transaction is not initiated 510, then the process idles 512. But when initiation of a purchase transaction is detected, then the mobile device processor transmits 514 the magnetic stripe data to a communications interface associated with a merchant device. In some embodiments, the emulated magnetic strip data comprises ISO 7813 Track 1 and Track 2 data, which may include a placeholder cardholder name, a service code indicating that no chip is available on the payment card, the unpredictable number (UN), and the dynamic CVC3 data.

It should be understood that, when the communications interface associated with the merchant device comprises a magnetic stripe reader, the emulated magnetic stripe data may be transmitted to the magnetic stripe reader in a variety of ways depending on the components associated with the cardholder's mobile device. For example, the emulated magnetic stripe data may be transmitted via an inductive chip of the cardholder's mobile device, or via a companion device that includes a magnetic stripe associated with the cardholder's mobile device, or via a companion device that includes an inductive chip associated with the cardholder's mobile device. Moreover, in some embodiments the merchant's device does not include a magnetic stripe reader, but instead includes a communications interface which may a microphone, a camera, a quick response (QR) reader, a radio frequency (RF) receiver, or an optical sensor, and/or the like. In such cases, the cardholder's mobile device is configured to communicate with such a communications interface to provide the emulated magnetic stripe data required to initiate a transaction.

An advantage provided by many or all of the embodiments described herein is that the security features provided require no modification of the transaction processing systems currently installed and/or in use by acquirer FIs and/or payment card issuer FIs. In particular, the POS terminals and/or payment card authorization systems currently in use throughout the United States and other countries (which utilize magnetic stripe card readers), and the payment card networks and/or systems do not have to be changed or modified.

The flow charts and descriptions thereof herein should not be understood to prescribe a fixed order of performing the method steps described therein. Rather, the method steps may be performed in any order that is practicable, including combining one or more steps into a combined step.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method for emulating payment via a magnetic stripe payment card comprising:

activating, by a mobile device processor of a cardholder's mobile device, a simulated magnetic stripe payment wallet application;

transmitting, by the mobile device processor to a digital enablement service computer, information indicating the activation of the simulated magnetic stripe payment wallet application;

receiving, by the mobile device processor from the digital enablement service, at least one cryptographic key;

generating, by the mobile device processor, an Unpredictable Number (UN);

performing, by the mobile device processor, a cryptographic calculation based on the UN, the at least one cryptographic key, a transaction count value maintained in the mobile device, and static data stored in the mobile device resulting in dynamic CVC3 data;

assembling, by the mobile device processor, emulated magnetic stripe data comprising a placeholder cardholder name, a service code, the UN, and the dynamic CVC3 data, wherein the service code indicates unavailability of a chip on the payment card;

detecting, by the mobile device processor, initiation of a purchase transaction; and transmitting, by the mobile device processor in response to detecting the initiation of the purchase transaction, the emulated magnetic stripe data to one of a magnetic stripe reader or a communications interface associated with a merchant device.

2. The method of claim 1, wherein the emulated magnetic stripe data is transmitted to a magnetic stripe reader via an inductive chip of the cardholder's mobile device.

3. The method of claim 1, wherein emulated magnetic stripe data is transmitted to a magnetic stripe reader via a companion device comprising a magnetic stripe associated with the cardholder's mobile device.

4. The method of claim 1, wherein the communications interface comprises one of a microphone, a camera, a quick response (QR) reader, a radio frequency (RF) receiver, or an optical sensor.

5. The method of claim 1, further comprising, prior to transmitting the information indicating the activation of the simulated magnetic stripe wallet application:

transmitting, by the mobile device processor to the digital enablement service computer, enrollment data; and receiving, by the mobile device processor from the digital enablement service, a token and a single use key.

6. The method of claim 5, wherein the enrollment data comprises the cardholder's primary account number (PAN), billing address and security information.

7. A payment-enabled mobile device comprising:

a mobile device processor;

a communications device operably connected to the mobile device processor;

a storage device operably connected to the mobile device processor, wherein the storage device stores a simulated magnetic stripe payment wallet application and processor executable instructions which when executed cause the mobile device processor to:

activate the simulated magnetic stripe payment wallet application;

transmit information to a digital enablement service computer indicating the activation of the simulated magnetic stripe payment wallet application;

receive at least one cryptographic key from the digital enablement service computer;

generate an Unpredictable Number (UN);

perform a cryptographic calculation based on the UN, the at least one cryptographic key, a transaction count value maintained in the mobile device, and static data stored in the mobile device resulting in dynamic CVC3 data;

assemble emulated magnetic stripe data comprising a placeholder cardholder name, a service code, the UN, and the dynamic CVC3 data, wherein the service code indicates unavailability of a chip on the payment card;

detect initiation of a purchase transaction; and transmit, in response to detecting the initiation of the purchase transaction, via the communications device the emulated magnetic stripe data to one of a magnetic stripe reader or a communications interface associated with a merchant device.

8. The apparatus of claim 7, wherein the communication device of the payment enabled mobile device comprises at least one of an inductive chip, a companion device comprising a magnetic stripe, and a companion device comprising an inductive chip.

9. The apparatus of claim 7, wherein the communication device of the payment enabled mobile device comprises at least one of an NFC device, a Bluetooth module, and a WiFi device.

10. The apparatus of claim 7, further comprising a secure element operably connected to the mobile device processor, wherein the secure element stores the simulated magnetic stripe payment wallet application.

11. The apparatus of claim 7, wherein the storage device stores further processor executable instructions, prior to the instructions for transmitting the information indicating the activation of the simulated magnetic stripe payment wallet application, which when executed cause the mobile device processor to:

transmit enrollment data to the digital enablement service computer; and receive a token and single use key from the digital enablement service for use in simulated magnetic stripe payment account transactions.

* * * * *